United States Patent [19]
Werner

[11] Patent Number: 4,507,128
[45] Date of Patent: Mar. 26, 1985

[54] PNEUMATIC LINE BREAK CONTROL SYSTEM AND METHOD

[76] Inventor: Robert O. Werner, 14526 Broadgreen, Houston, Tex. 77079

[21] Appl. No.: 395,704

[22] Filed: Jul. 6, 1982

[51] Int. Cl.[3] .............................................. F16K 31/00

[52] U.S. Cl. ........................................ 48/193; 48/191; 73/40.5 R; 137/1; 137/110

[58] Field of Search ................. 48/190, 191, 192, 193; 137/1, 12, 14, 110, 487.5; 73/40.5 R

[56] References Cited

U.S. PATENT DOCUMENTS

| | | | |
|---|---|---|---|
| 1,803,437 | 5/1931 | Riney et al. | 48/191 |
| 1,947,647 | 2/1934 | Riney et al. | 48/191 |
| 2,041,863 | 5/1936 | Rhodes | 48/191 |
| 3,776,249 | 12/1973 | Wailes et al. | 137/487.5 |
| 4,355,654 | 10/1982 | Levesque et al. | 137/110 |

*Primary Examiner*—Peter Kratz
*Attorney, Agent, or Firm*—Gunn, Lee & Jackson

[57] ABSTRACT

A pneumatically controlled system is provided for detecting and isolating a rupture in one or more lines of a parallel looped gas transmission network employing valve controlled equalizing lines at intervals. When the gas transmission network incorporates three or four mainlines the direction and magnitude of flow in the equalizing lines is sensed pneumatically and a pneumatic signal representing such flow is transmitted to a control module. The control module is effective to close selected mainline valves and equalizing line valves to isolate a ruptured pipeline section while permitting other valves to remain open thus continuing gas transmission in other portions of the transmission system.

24 Claims, 5 Drawing Figures

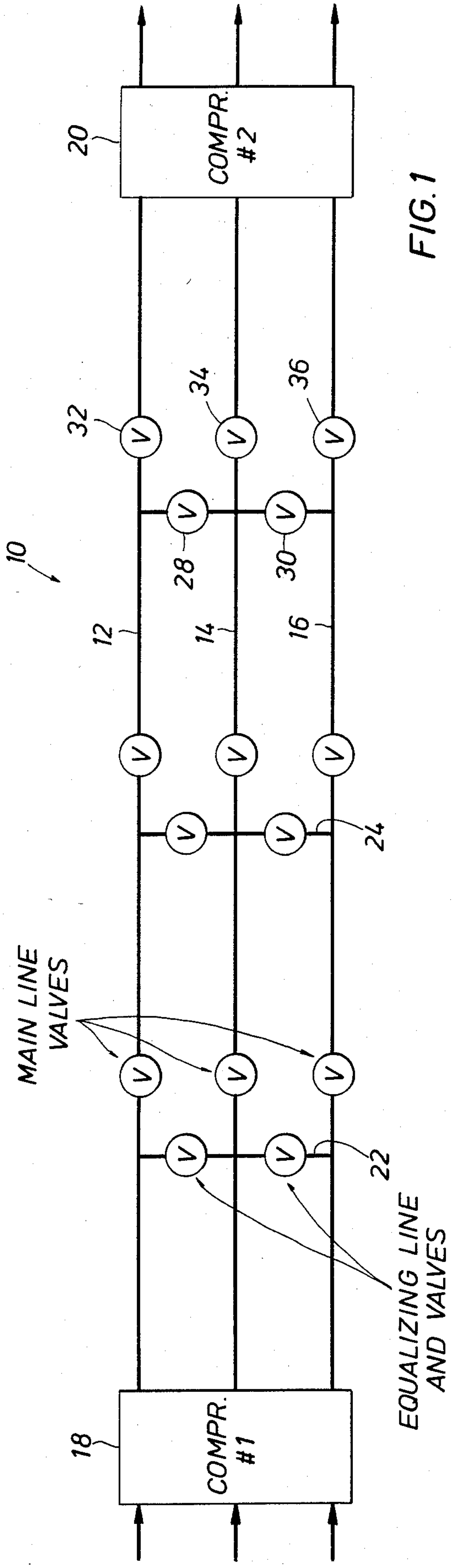
FIG. 1
FIG. 5
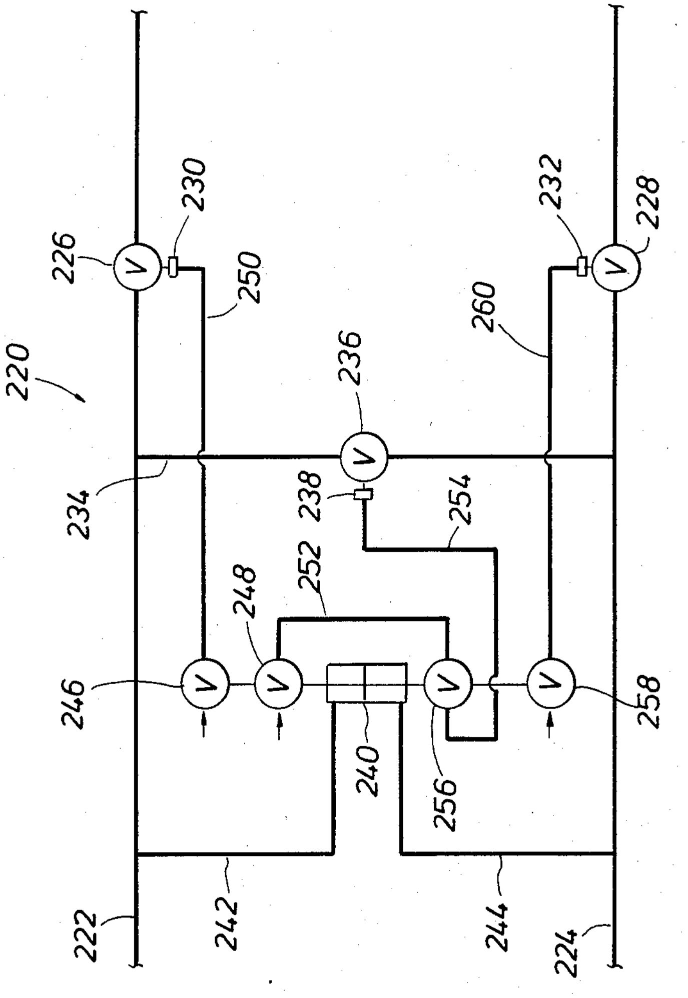

PNEUMATIC LINE BREAK CONTROL SYSTEM AND METHOD

FIELD OF THE INVENTION

This invention relates generally to safety devices for gas transmission systems and more particularly relates to a pneumatically energized mechanical system for use in parallel looped gas transmission networks which is effective to detect a rupture in a portion of the gas transmission network, isolate it by closing particular valves and continuing productive flow through other portions of the gas transmission network.

BACKGROUND OF THE INVENTION

In the transmission of large volumes of gas, such as natural gas for example, a pipeline system is typically employed having compressor stations located at intervals along the length thereof to increase the pressure of the flowing gas and thus compensate for pressure loss due to line friction and other factors. The least amount of horsepower required to move a given quantity of gas between compressor stations occurs when the stations are connected by a single large gas transmission pipeline. Since natural gas is typically shipped in large volumes the physical dimension of a single large diameter pipeline to transport the required gas volume would be impractical from a commercial standpoint. The next most efficient method for transporting that same volume of gas or fluid is to connect the compressor stations with two or more gas transmission lines having equalizing lines interconnecting them at periodic intervals. For this reason most interstate gas transmission networks incorporate plural parallel main lines which form parallel looped transmission networks having equalizing lines interconnecting the main lines at periodic intervals and thus maintaining substantially equal pressure in all of the main lines. The main lines have valves located at periodic intervals along the length thereof and the equalizing lines also typically incorporate valves so that the main lines can be isolated, if desired. The valves of the main lines and equalizing lines may be selectively closed to isolate portions of the gas transmission network in the event service or repair is required without necessitating shutting down of the entire gas transmission network.

When a gas transmission network of this nature is in full operation all of the main line valves and equalizing line valves are typically open and the pressure of the gas therein is substantially equal at any particular point along the length thereof because of the presence of the equalizing lines. When a gas transmission network is operating in this mode, the fluid flow in the equalizing lines is either very low or non-existent. If a pressure variation occurs in one of the main lines, it will typically be maintained as it flows along the main line until it reaches an equalizing line. This pressure variation will then be communicated by the equalizing line to each of the other main lines, thus ensuring that as the pressurized gas reaches a subsequent compressor station the pressure in each of the main lines will be substantially equal.

When a pressure variation in a main line is equalized by an equalizing line, obviously there is flow in the equalizing line from high pressure to low pressure. Flow therefore occurs in the equalizing lines to accomplish pressure balancing. The direction and duration of flow in the equalizing line is of course responsive to the magnitude of the pressure variation that has occurred. Typically, the flow in an equalizing line is of low velocity and short duration except under circumstances where a line rupture occurs. If a main line should rupture, the flow in the equalizing line rises rapidly due to the unbalanced pressure condition between the ruptured and unruptured lines. Additionally, the direction of flow in the equalizing lines is toward the rupture. It is these two parameters, magnitude of flow and direction of flow, which form the basis for the control logic of the present invention. Obviously, it is necessary that a line break detection and isolation system be capable of efficiently distinguishing between short term line pressure surges and actual line rupture to thereby ensure against automatic shut down of the gas transmission system in the event short term pressure surges are encountered.

THE PRIOR ART

Rupture of natural gas handling networks and other fluid transmission systems has long been a problem especially in the petroleum product industry. A number of systems have been developed in the past for the purpose of detecting a condition of rupture in fluid transmission networks and automatically shutting them down or actuating valving in order to isolate a ruptured section of the network. All of the known developments concerning line break controls relate to the detection of pressure decay or excessive velocity of flow in a main line. In some cases, these developments have taken the form of pneumatically energized mechanical systems such as disclosed in U.S. Pat. Nos. 1,956,010; 3,771,543; 3,742,970; 4,004,607; 4,051,715; 4,074,692 and 4,109,512. In other cases, electromechanical systems utilizing pneumatic control for line break detection have been developed as taught by U.S. Pat. Nos. 2,041,862 and 2,072,314. Electronic line break control systems have also been developed which particularly detect pressure decay in main line systems, such as taught by U.S. Pat. Nos. 3,665,945; 3,776,249; 3,782,168 and 3,952,759.

SUMMARY OF THE INVENTION

It is a primary feature of the present invention to provide a novel system for use in conjunction with parallel looped gas transmission networks which is effective to detect the presence of a rupture, isolate the ruptured portion of the gas transmission network and continue productive flow through unruptured portions of the network.

It is another feature of this invention to provide a novel system for detecting and isolating a rupture in a parallel looped gas transmission network incorporating equalizing lines between main lines and wherein the parameters of magnitude and direction of flow in an equalizing line form the basis for control logic for line break detection and isolation.

It is an even further feature of this invention to provide a novel system for detecting and isolating ruptures in a parallel looped gas transmission network which effectively compensates for pressure variations and ensures against inadvertent line shut down responsive to line pressure surges.

It is an important feature of the present invention to provide a novel system for detection and isolation of ruptures in parallel looped gas transmission networks which is of mechanical nature, requiring no external power source and is thereby enabled to be placed in remote locations or which may be powered pneumatically, hydraulically or electrically, as desired.

It is another feature of this invention to provide a novel line break detection and isolation system which is adapted for operation by pressure differential between two adjacent mainlines of a gas transmission network having only two mainlines.

It is another feature of this invention to provide a novel line break detection and isolation system for parallel looped gas transmission networks which is of simple nature, reliable in use and low in cost.

Briefly, in gas transmission networks incorporating parallel looped transmission pipeline networks with three or more main lines, each of the equalizing line segments between main lines is provided with apparatus for sensing the direction and velocity of flow in that equalizing line segment. Flow in each segment of the equalizing line is sensed by means of a bidirectional pitot tube which senses flow as differential pressure and transmits pneumatic differential pressure signals to a control module via appropriate tubing. The sensed differential pressure causes a spring centered piston in the control module to be displaced, with piston displacement being determined by the magnitude and direction of the flow induced pressure differential. At either end of the piston travel within the control module, control valving is actuated. Appropriate control lines interconnect the control valving in proper logic with main line and equalizing line valve operators to thereby close the appropriate main line and equalizing line valves and thereby isolate the ruptured line segment. The control module is designed with sufficient internal volume so that a time delay of adequate duration can be achieved to preclude premature control valve actuation, thus ensuring against valve actuation responsive to line surges. The internal volume of the control module is also of sufficient volume to ensure adequate internal piston travel to accommodate proper bypass port spacing to achieve a piston travel versus bypass port spacing (gain) of not less than 4:3.

The control module is actuated by the differential pressure as generated by the bidirectional pitot tube responsive to fluid flow in the equalizing line. The pressure differential, thus generated, is determined by the equation:

$$dp = 1.43p\frac{V^2}{2}$$

Because the geometry of the equalizing line is a constant, the velocity in the line is a constant, proportional to the pressure imbalance and independent of line pressure. The control module must therefore correct the pitot tube's output (dp) for pressure. Pressure correction is accomplished by the bypass containing a needle valve that is positioned by line pressure. The net effect of the needle valve is to increase the dimension of the bypass responsive to high line pressure and reduce or throttle the dimension of the bypass responsive to lower line pressure. The bypass port spacings determines where the control module changes gain. Considering the port spacing in conjunction with the bypass needle valve, the net effect is to produce a variable dead band.

In the event the gas transmission network is composed of two parallel lines that are interconnected by equalizing lines, the pressure differential communicated to the control module may be taken as the differential pressure between the two main lines rather than in the equalizing line as in the case of transmission systems having three or more main lines.

The line break detection and isolation system is also operative in gas transmission systems incorporating only two parallel main lines. In this case, differential pressure sensed by the control module may be taken directly from each main line rather than in the equalizing line.

Other and further objects, advantages and features of the present invention will become apparent to one skilled in the art upon consideration of this entire disclosure including the specification and the annexed drawings. The form of the invention, which will now be described in detail, illustrates the general principles of the invention, but it is to be understood that this detailed description is not to be taken as limiting the scope of the present invention.

BRIEF DESCRIPTION OF THE DRAWINGS

So that the manner in which the above recited features, advantages and objects of the present invention are attained and can be understood in detail, more particular description of the invention briefly summarized above may be had by reference to the embodiment thereof which is illustrated in the appended drawings, which drawings form a part of this specification.

It is to be noted however that the appended drawings illustrate only a typical embodiment of the invention and are therefore not to be considered limiting of its scope, for the invention may admit to other equally effective embodiments.

IN THE DRAWINGS

FIG. 1 is a schematic illustration of a gas transmission system having compressor stations at intervals and a parallel looped transmission network incorporating three valve controlled main lines with valve controlled equalizing lines at intervals along the length thereof.

Figure 2:
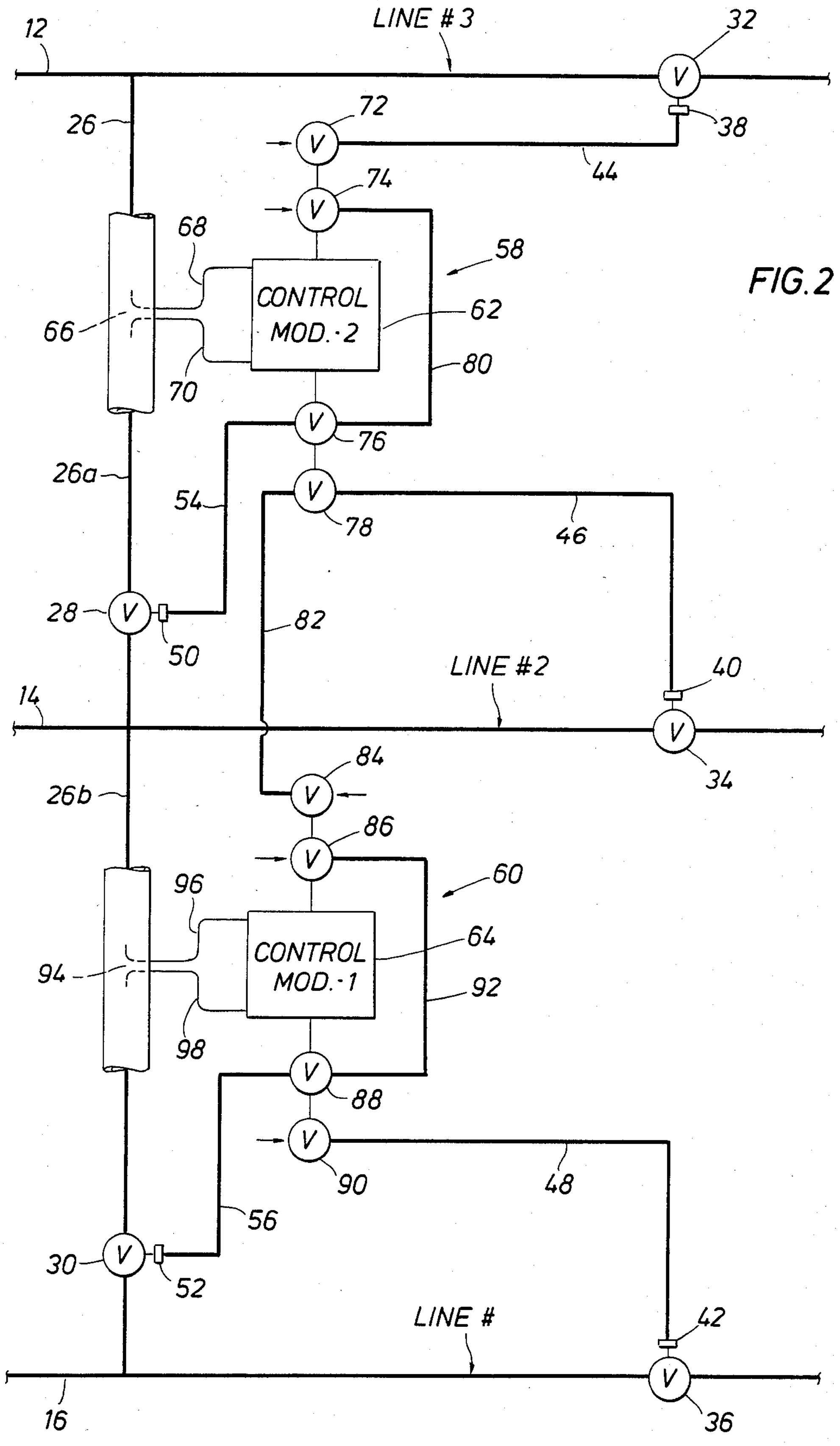

FIG. 2 is a schematic illustration of a line rupture detection and isolation system constructed in accordance with the present invention and being in operative assembly with a parallel looped gas transmission network such as shown in FIG. 1.

Figure 3:
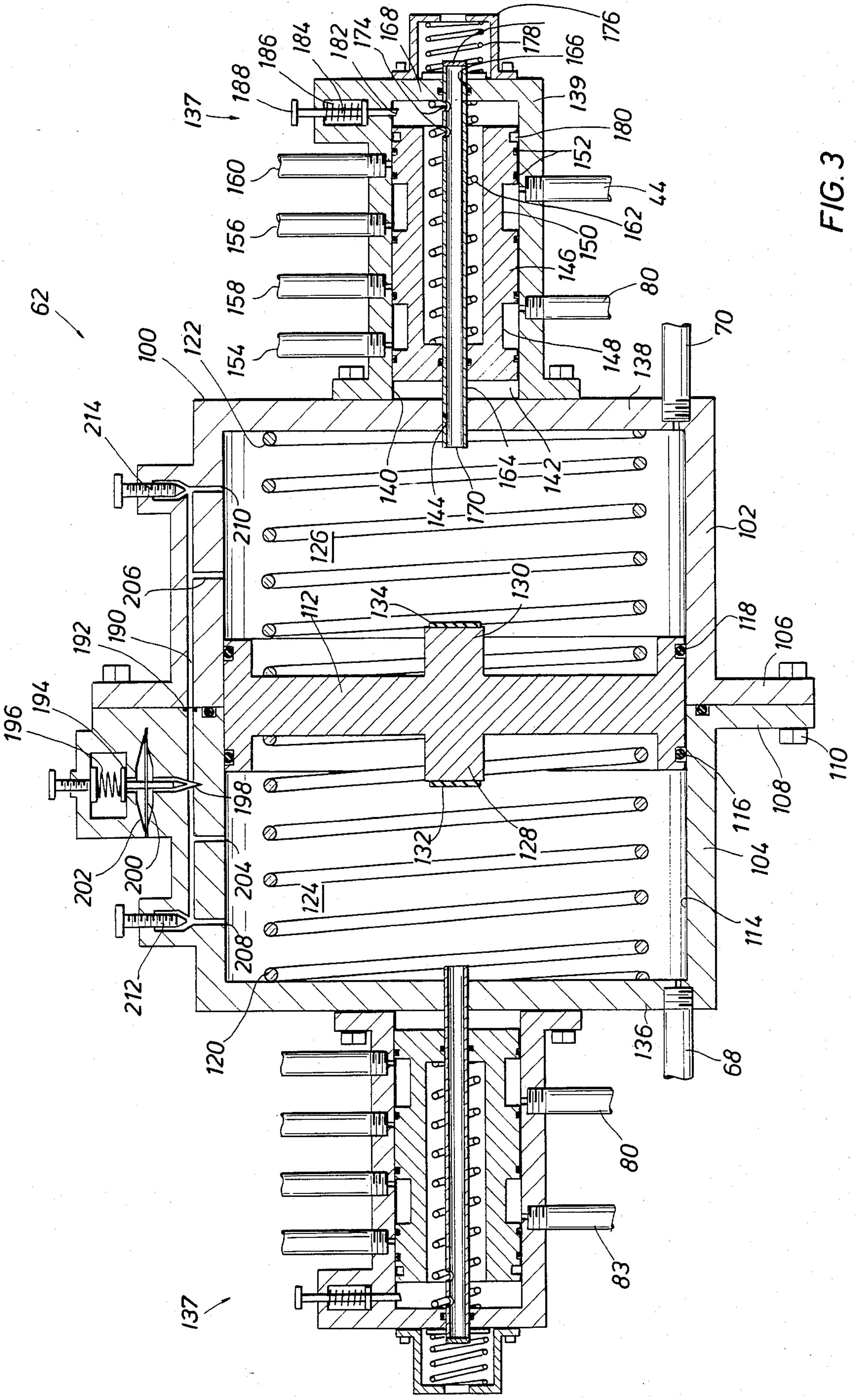

FIG. 3 is a sectional view of a control module constructed in accordance with the present invention and which is operative responsive to sensed flow developed differential pressure to achieve selective valve actuation to accomplish closing of selected valves of the main line and equalizing line for isolation of a ruptured line section.

Figure 4:
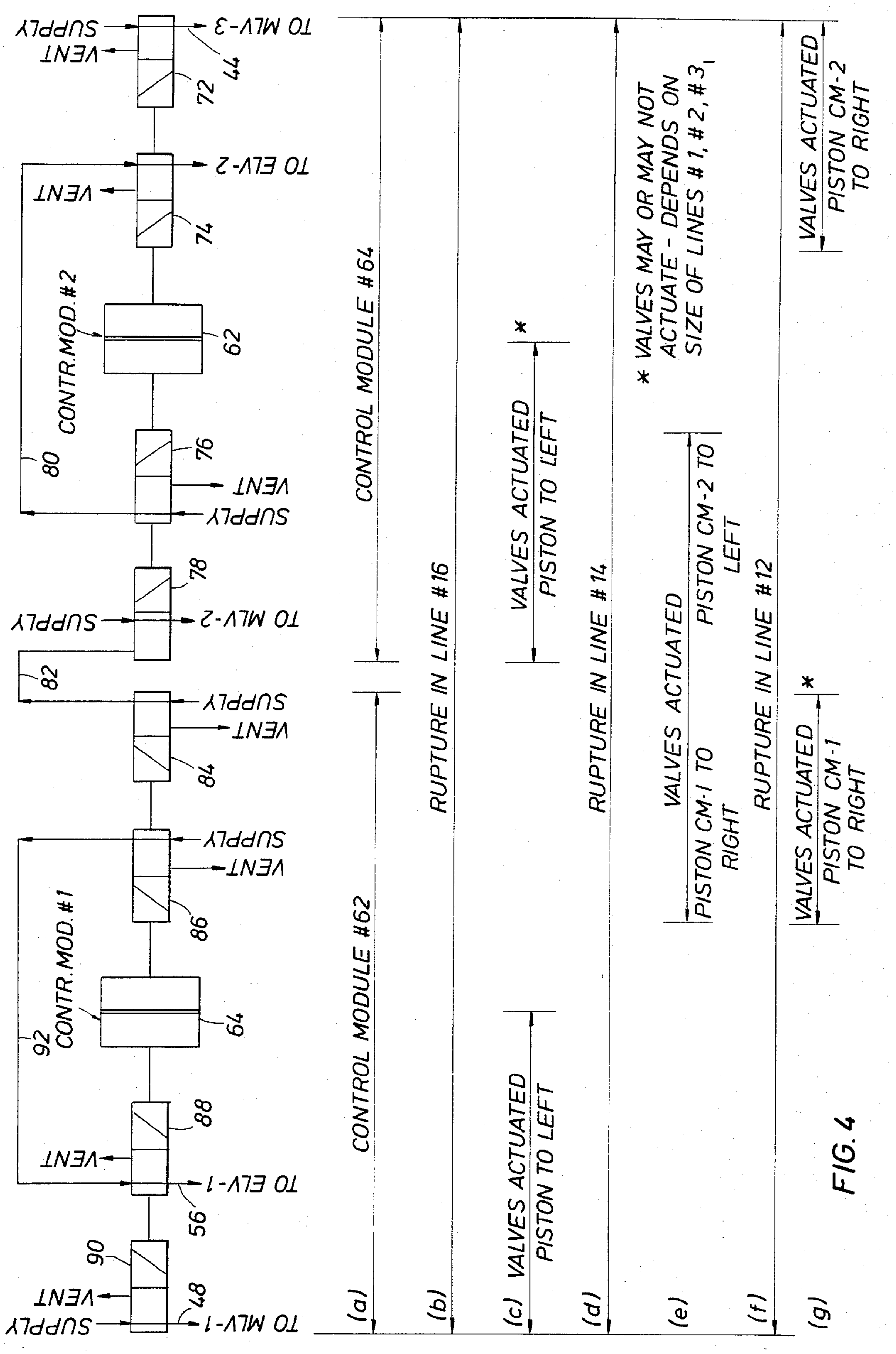

FIG. 4 is a correleated schematic illustration showing two control modules of a line rupture detection and isolation system of the present invention and graphical control logic for a rupture in either of the three main lines of FIGS. 1 and 2.

FIG. 5 is a schematic representation of a line break detection and isolation system employed in conjunction with a gas transmission system incorporating only two mainlines.

DETAILED DESCRIPTION OF PREFERRED EMBODIMENT

Referring now to the drawings and first to FIG. 1, a parallel looped fluid transmission network is illustrated generally at 10 wherein main transmission lines 12, 14 and 16 are connected between compressor stations 18 and 20. As mentioned above, plural parallel transmission lines are employed in lieu of a single large diameter transmission line for the purpose of economy. In order to maintain each of the transmission lines 12, 14 and 16 at substantially equal pressure, equalizing line such as shown at 22, 24 and 26 are provided at spaced intervals along the transmission network. The equalizing lines each comprise equalizing line segments connected between adjacent main lines. Each of the equalizing line segments is typically provided with a valve such as shown at 28 and 30 which are normally maintained in the open condition thereof for equalizing pressure communication. The valves of the equalizing lines may be selectively closed in order to isolate portions of the main lines as will become evident hereinbelow. The main transmission lines 12, 14 and 16 are also typically provided with valves such as shown at 32, 34 and 36 which may be selectively closed in correlated manner with the equalizing valves to thus provide for isolation of selected sections of the main transmission lines.

The main line valves and equalizing valves are typically arranged in closely spaced groups for efficiency of control. Three such valve groups are shown in FIG. 1 between compressor stations 18 and 20. FIG. 2 is a schematic illustration of one such group of main line valves and equalizing line valves which are automatically controlled responsive to a rupture in the gas transmission system. Each of the main line valves 32, 34 and 36 are provided with valve operators 38, 40 and 42 respectively, which are energized in any suitable manner and which are communicated by means of fluid control lines 44, 46 and 48. Likewise, the equalizing line valves 28 and 30 are provided with valve operators 50 and 52 which are communicated by means of control lines 54 and 56.

As shown in FIG. 2, the equalizing line 26 is segmented into equalizing line segments 26*a* and 26*b* by its intermediate connection with the center main line 14. It is therefore desirable to provide each of the equalizing line segments with means for detecting and isolating rupture of either of the main lines 12, 14 or 16. For this reason, equalizing line segments 26*a* and 26*b* are each provided with rupture detection and isolation systems illustrated generally at 58 and 60 which incorporate control modules 62 and 64 respectively. In each case the control modules 62 and 64 are fluid energized mechanical systems which function responsive to differential pressure induced by fluid flow in the respective equalizing line segements. The control module 62 includes a bidirectional pitot 66 which is positioned within the equalizing line 26 with pitot orifices communicated respectively to differential pressure lines 68 and 70. The differential pressure lines are communicated respectively with variable volume chambers defined within the housing of the control module 62 as is evident from FIG. 4. The control system 58 also incorporates a plurality of control valves such as shown at 72, 74, 76 and 78 which have a normal position responsive to control module inactivity and which have an operative or valve closing position responsive to flow induced energization of the control module. As shown in FIG. 2, control valve 72 is in communication with control line 44 of the valve operator 38 while control valves 74 and 76 are interconnected by control line 80. Control valve 76 is in communication with control line 54 of valve operator 50. Control valve 78 is connected by control line 82 to control valve 84 of the control module 64. The control module 64 includes other control valves 86, 88 and 90 which are in communication respectively with control lines 92, 56 and 48 as shown. The control module 64 also incorporates a bidirectional pitot 94 which is communicated by differential pressure lines 96 and 98 to variable volume chambers within the control module.

Referring now to FIG. 3, the control module illustrated generally at 58 in FIG. 2 is shown in greater detail. It should be borne in mind that the control module 62 is exemplary only of the theoretical aspects of the present invention. It is to be understood, therefore, that the control module may take any one of a number of suitable forms without departing from the spirit and scope of this invention. As shown in FIG. 3 the line break detection and isolation system 58 incorporates a control module illustrated generally at 62 which is shown to comprise a housing 100 defining an internal chamber, preferably of cylindrical configuration. As shown, the housing 100 is defined by housing elements 102 and 104 each defining connection flanges 106 and 108 respectively which are secured in sealed assembly by means of bolts 110. A piston element 112 is movably positioned within the housing chamber and is maintained in sealed relation with an inner cylindrical wall 114 of the housing by means of annular sealing elements 116 and 118 which are retained within outer peripheral seal grooves of the piston. The piston element 112 is normally centered within the housing chamber by means of compression springs 120 and 122 and functions to separate the housing chamber into a pair of variable volume chambers 124 and 126. The piston further incorporates a pair of valve actuating projections 128 and 130 each having resilient sealing elements 132 and 134 secured thereto.

Housing 100 of the control module 62 incorporates end wall structures 136 and 138 to which are connected the differential pressure supply lines 68 and 70 as shown in FIG. 2, thereby communicating the pressures from each side of the bidirectional pitot 66 into respective ones of the variable volume chambers 124 and 126. The value or magnitude of the pressure differential will of course be responsive to the velocity of fluid flow in the equalizing line segment 26*a*. Upon the development of an unbalanced pressure condition, i.e., pressure differential, within the respective variable volume chambers 124 and 126, the piston element 112 will be moved by the force differential developed thereon toward the chamber of lesser pressure. The duration of piston movement will likewise be responsive to the duration of existing pressure differential. In the event the pressure differential exists for only a short time such as in the case of a typical line pressure surge and then becomes equalized as pressure in the main lines becomes equalized, piston movement will cease. The compression springs 120 and 122 will therefore return the piston to its centered position within the chamber defined by the housing. The housing will therefore be of sufficiently great length to ensure compensation for the maximum line surges that are expected. In the event of a rupture in either of the main lines, an equalized pressure condition will not be established within a predetermined period of time and therefore piston movement will continue until piston energized valve actuation occurs to accomplish valve controlled isolation of the ruptured portion of the gas transmission system.

As shown in FIG. 3, the control valve functions of the control module are accomplished by means of spool valve assemblies illustrated generally at 137, each having dual valve functions to achieve valve operator energization. The spool valve assemblies are shown to be essentially identical although such is not a requirement for purposes of this invention. For this reason only one of the spool valve assemblies is discussed in detail. The spool valve assembly 137 at the right side of Figure incorporates a valve housing structure defining an internal cylindrical surface 140 forming a valve chamber 142. The valve chamber 142 is in communication with the variable volume chamber 126 of the housing 100 by means of an opening 144 in the end wall 138 of the housing. A spool valve element 146 is movably positioned within the valve chamber 142 and forms a pair of circular grooves 148 and 150 which communicate valve actuator lines 44 and 80 with respective vent or supply lines, depending upon the position of the spool valve within the valve chamber. A plurality of annular sealing elements such as shown at 152 and which may take the form of resilient O-rings are provided to establish seals between the spool valve and the cylindrical surface 140 of the housing 138. The sealing elements thereby isolate the respective annular grooves 148 and 150 from other internal portions of the valve chamber 142. The valve assembly 136 incorporates vent lines 154 and 156 and supply lines 158 and 160. Each of the supply lines is communicated with a supply of pressurized fluid such as natural gas, air, etc., which forms the energy source for actuation of the various valve operators of the main line valves and equalizing valves. It should be borne in mind that the supply and vent lines may be reversed depending on the character of valve operator control.

The spool valve 146 is normally positioned within the valve chamber 142 by means of a compression spring 162. In absence of other forces therefore the spool valve will be positioned in the manner shown in FIG. 3 thereby communicating vent lines 154 and 156 with the respective valve operator control lines 80 and 44. In this position therefore the valve operator control lines 80 and 44 will be unpressurized and the respective valve operators 38 and 50 controlled thereby will be in the normal positions thereof and the valves associated therewith will be open.

When it becomes appropriate to automatically close certain ones of the main line valves and equalizing valves selected ones of the control valve assemblies 136 and 138 will be mechanically operated thereby shifting the respective spool valve thereof to a position communicating the pressurized fluid supply lines with the valve operator control lines. In order to accomplish such mechanical shifting of the spool valve 146, the spool valve is provided with a tubular actuating element 164 having a portion thereof extending from the valve chamber 142 through the end wall opening of the housing and into the variable chamber 126. The tubular valve actuating element is positioned for contact by the resilient sealing portion 134 of the piston projection 130 in the event the piston 112 moves a sufficient distance within the control module housing to accomplish such contact. The tubular valve actuating element 164 is sealed and movable with respect to the spool valve element 146 and is of sufficient length that a portion of it extends through an aperture 166 defined in a closed end wall 168 of the valve housing 138. The tubular valve actuating element has an open extremity 170 positioned within the variable volume chamber 126 and a closed extremity 172 which is positioned outwardly of the housing 138. The closed extremity 172 prevents venting of pressure from the inner portion 173 of the valve chamber 142 in the normal position of the tubular valve actuating element as shown in FIG. 3. A pair of spaced venting ports 174 are formed in the wall structure of the tubular valve actuating element 164. In the normal position of the tubular element as shown in FIG. 3 both of the ports 174 are positioned within the valve chamber 173. Upon movement of the valve actuating rod 164 to the right from the position shown in FIG. 3, one of the venting ports 174 will be positioned outwardly of the valve housing while the innermost port will be positioned within the valve chamber 173. When so positioned, pressurized fluid from the valve chamber 173 will be vented to the atmosphere, thus developing a pressure differential which forces the spool outwardly. A valve retainer element 176 is secured to the housing in any suitable manner and retains a compression spring 178 which develops an urging force acting upon the outer extremity of the valve actuating rod 164 to urge it toward the normal position thereof as shown in FIG. 3.

After the spool valve element 146 has been shifted to the right and the respective valve operators interconnected with control lines 44 and 80 have been automatically operated to the closed positions thereof thus isolating ruptured section of transmission line, the gas transmission system will then automatically return to a condition of equilibrium. When this occurs the differential pressure within the variable volume chambers 124 and 126 of the control module housing will become equalized and the piston element 113 will be returned to its centered position by the compression springs 120 and 122. It is desirable in this condition however to ensure that the closed main line and equalizing line valves remain closed to enable the ruptured section of line to remain isolated. It is therefore appropriate for the spool valve element 146 to remain in the rupture actuated position thereof thus ensuring that the respective control lines thereof remain pressurized or unpressurized, as the case may be. To accomplish this feature the valve spool element 146 is formed to define an annular latching groove 180 within which is received a latching detent portion 182 of a latch element 184. The latch element is urged toward the latching position thereof by means of a compression spring 186. When the spool valve element moves to the right the detent 182 of the latch element will become engaged within the latching groove 180. The latch will thus retain the spool valve element 146 in its operated position until service personnel determine that the closed main line and equalizing line valves may again be reopened. Such personnel will then grasp an externally positioned operating handle 188 of the latch 184 and by pulling outwardly on it will remove the detent 182 from the latching groove 180. This release the spool valve element 146 thereby allowing the compression spring 162 to drive it to the left, toward the normal position thereof.

As the sealing portion 134 of the piston projection 130 moves into engagement with outer extremity 170 of the valve actuating tube 164 a seal is developed which isolates the pressurized fluid within the tubular element 164 from the variable volume chamber 126. As soon as the tubular element 164 is moved to the right sufficiently to position the venting ports 174 in venting position, the downstream portion 173 of the valve chamber 142 will be vented to the atomosphere. When this occurs, an unbalanced pressure condition is developed at the respective extremities of the spool valve element 146 thereby developing a resultant force urging it to the right against the force of the compression spring 162. After the spool valve element has moved to the right and becomes latched in its operating position the tubular element 164 is then held in its venting position only by contact with the sealing portion 134 of the piston element 112. As the piston element moves toward its centered position, the spring 178 will force the tubular element to follow the piston until the tubular element reaches the FIG. 3 position. The piston will continue to move toward its centered position, thereby breaking sealing contact with the end portion 170 of the tubular element. When this occurs, the tubular element will have been moved by compression spring 178 back to the non-venting, FIG. 3 position thereof. The spool valve 146 will remain in its operated position by virtue of its retention by the latch element 184.

On the opposite side of the control module 62 the control valve assembly 138 is constructed essentially identical with the valve assembly 136. Control valve 138 also functions in the same manner as 136 as explained above. The control valves 136 and 138 are oppositely positioned with respect to the housing 100 to permit control module actuation responsive to flow in either direction in the equalizing line. Depending upon the direction of flow in the equalizing line, a differential pressure will be developed within the variable volume chambers 124 and 126 which will result in piston movement in a direction representative of the direction of fluid flow in the equalizing line. Of course, the direction of flow in the equalizing line is determined by the location of the rupture, i.e., in main lines 12, 14 or 16 as set forth in FIGS. 1 and 2.

As mentioned above, the control module is actuated by differential pressure as generated by the bidirectional pitot tube. The pressure differential is expressed by the equation:

$$dp = 1.43p\frac{V^2}{2}$$

Because the geometry of the equalizing line is a constant, the velocity in the equalizing line is expressed as a constant, proportional to the pressure imbalance and independent of line pressure. The control module must therefore correct the piston tube output (dp) for pressure. In accordance with the present invention, such pressure correction is accomplished by means of a bypass system interconnecting the variable volume chambers on each side of the piston member 112. Pressure correction is accomplished by means of a line pressure controlled needle valve which controls flow in the bypass system. The net effect of this arrangement is to increase the effective dimension of the bypass system on high pressure and throttle it on low pressure.

As shown in the control module 62 of FIG. 3 bypass passage sections are defined by each of the housing sections 102 and 104 and cooperate to define in elongated bypass passage 190. An annular sealing member 192 provides a seal about the bypass passage 190 at the joint between the housing flanges. The valve housing 104 is formed to define a pressure controlled needle valve assembly incorporating a needle valve 194 which is urged by a compression spring 196 toward a seated relationship with a valve seat surface 198. The needle valve is extended in sealed relation through a diaphragm 200 which extends across a diaphragm chamber 202 formed in the housing section. Gas pressure from the chambers 124 and 126 is communicated to the needle valve assembly and thus acts upon the diaphragm 200 tending to force the needle valve 194 in a direction opposing the force of the compression spring. Under low pressure conditions the spring 196 urges the needle valve 194 toward a more closed position relative to the needle valve seat 198, thus restricting flow through the bypass passage 190. Under higher pressure conditions, pressure acting upon the diaphragm 200 tends to force the needle valve 194 toward a more fully opened position thereby permitting greater flow through the bypass passage 190.

The bypass system is also provided with a gain control which is shown in the drawing as being represented by a plurality of gain controlling passages communicating the bypass passage 190 with respective ones of the module chambers 124 and 126. As shown in FIG. 3, a pair of passages 204 and 206 are formed in the housing sections. The passages 204 and 206 define bypass port spacing of a particular dimension relative to the length of the cylindrical housing 100 and the thickness of the piston 112. The housing sections also define valve controlled passages 208 and 210 which also intersect the bypass passage 190 and which may be disposed in an open or closed position by positioning of gain control valves 212 and 214. The valve controlled passages 208 and 210 provide a particular bypass port spacing which is greater than that of passages 204 and 206. When the bypass valves 212 and 214 are open, the gain of the control module is determined by bypass passages 208 and 210. Likewise, when the valves 212 and 214 are closed, the gain of the control module is determined by the spacing of passages 204 and 206. As shown in FIG. 3 the control module 62 is provided with two gain selections which are accomplished simply by opening or closing the gain control valves 212 and 214. Obviously, a control module such as shown in FIG. 3 may be provided with any suitable number of gain controls without departing from the spirit and scope of the present invention. The bypass port spacing determines where the control module changes gain. Considering the port spacing in conjunction with the bypass needle valve the net effect is to produce a variable dead band. After sufficient piston movement has occurred to close the active bypass passage, the result will be a change in gain which causes the piston to move more rapidly to its valve actuating position.

Referring now to FIG. 4, a schematic valve illustration is presented together with a logic diagram depicting a rupture in main lines 12, 14 and 16 as shown in FIGS. 1 and 2. In FIG. 4, two control modules are depicted which are representative of control modules 62 and 64 in FIG. 2. Line "a" of FIG. 4 illustrates the separation of control modules 62 and 64. Line "b" is representative of a rupture in main line 16 with valve actuation identified in line "c" in such event. In the event of a rupture in line 16, the pistons of control modules 62 and 64 will move to the left at rates determined by the flow characteristics in the respective equalizing line segments **26*a* and 26*b*. Since the flow will be greater in equalizing line segment 26*b* in this case, the piston of control module 64 will reach its valve actuating position before the valve actuating position of control module 62 is reached. Control valves 88 and 90 will therefore be actuated to cause closing energization of main line valve 36 and equalizing line valve 30. At this time, main line valves 34 and 38 will remain open to continue flow of gas through respective main lines 14 and 12. The equalizing valve 28 will also remain open unless energized by actuation of control valves 76 and 78. Although the piston of the control module 62** will move to the left as shown in line "c", under ordinary circumstances it will not reach its valve actuating position before or simultaneously with control valve actuation of control module 64. Upon closing of the equalizing line valve 30, the flow in equalizing line segment 26b will cease and the flow in equalizing line segment 26a will cease or become drastically reduced. Upon this occurrence, the differential pressure within the variable volume chambers of control module 62 will become substantially balanced and the piston will therefore be moved by the compression springs toward its more centered relationship. Thus, the control valves 76 and 78 of control module 62 will not be actuated upon the occurrence of a rupture in main line 16.

Line "d" is representative of a rupture in main line 14. In this event, as shown in line "e" the piston of control module 62 will move to the left toward control valves 76 and 78 while the piston of control module 64 will move to the right toward control valves 84 and 86. The result will be closure of the main line valve 34 and the equalizing line valves 28 and 30. Main line valves 36 and 38 will remain open and gas transmission will continue through main lines 12 and 16. When the piston of control module 62 moves to the left responsive to a rupture in line 14 it will continue moving until control valves 76 and 78 become actuated thus causing automatic closure of equalizing line valve 28 and main line valve 34. If, at this time, equalizing line valve 30 remains open, a condition of rapid flow will exist in the equalizing line segment 26b thus causing the piston of control module 64 to move to the right and actuate control valves 84 and 86. When control valve 86 is actuated the valve operator 52 of equalizing valve 30 will be controlled through lines 56 and 92, thus moving to its closed position. Regardless which of the equalizing valves 28 and 30 become closed first responsive to a rupture in main line 14, both equalizing valves will ultimately become closed and main line valve 34 will also become closed to thereby isolate the ruptured line and continue productive flow through main lines 12 and 16.

As shown in lines "f" and "g" of FIG. 4, a rupture in main line 12 will cause the pistons of both of the control modules to move to the right because of the condition of flow in both of the equalizing line segments 26a and 26b. Since flow toward the rupture is responsive to the pressure of main lines 14 and 16, there will be greater velocity of flow in equalizing line segment 26a as compared to the flow in equalizing line segment 26b. Although the pistons of both control modules will be moving to the right, the piston of control module 62 will move at a greater velocity thereby actuating control valves 72 and 74 before control valves 84 and 86 can be actuated by control module 64. As soon as control valves 72 and 74 are actuated main line valve 32 and equalizing valve 28 will become closed. Closure of the main line valve 32 isolates the rupture in main line 12 while closure of the equalizing valve 28 ceases the condition of flow in equalizing line segment 26b. This will cause the piston of the control module to cease its differential pressure induced movement to the right and then be returned to its centered position by means of the piston springs. Main line valves 34 and 36 will therefore remain open and equalizing valve 30 will also remain open thereby allowing the flow of gas to continue in main lines 14 and 16 with line surge balancng being accomplished by the valve open condition of equalizing line segment 26b. It is therefore evident that a rupture in either of the main lines will cause automatic valve actuation by virtue of differential pressure sensing by both control modules in a triple main line looped gas transmission system. In the event a gas transmission system is utilized having more than three main lines, valve controlled equalizing lines will be provided for connection to adjacent main lines and additional control modules will be utilized for actuation of main line valves and equalizing line valves in the same manner as discussed above.

In the event a gas transmission system is utilized incorporating only two main lines which are disposed in parallel looped arrangements a line break control system for the two line network may conveniently take the form illustrated generally at 220 in FIG. 5. A pair of parallel main lines are shown at 222 and 224 which are controlled by main line valves 226 and 228 having valve operators 230 and 232 respectively. An equalizing line 234 interconnects the main lines 222 and 224 and is provided with an equalizing line valve 236 having a valve operator 238. A control module 240 which may be constructed in the manner of FIG. 3 is employed for detection and isolation of a rupture in either of the main lines 222 or 224. Instead of sensing a condition of flow in the equalizing line 234 the control module 240 is connected by control lines 242 and 244 with respective ones of the main lines as shown.

Should a rupture develop in main line 222 main line pressure in line 222 will deteriorate rapidly and pressure within main line 224 will deteriorate less rapidly, thereby developing a pressure differential between the two main lines. Under this condition a pressure differential will exist within the variable volume chambers of the control module thereby moving its piston upwardly as shown in FIG. 5 to cause activation of control valves 246 and 248. The valve operators 230 and 238 will be actuated by control pressure in lines 250, 252 and 254, thereby inducing closure of the main line valve 226 and the equalizing valve 236.

In the event of a rupture in main line valve 224, an opposite pressure differential will be developed within the control module 240 thereby inducing downward movement of the piston and causing activation of control valves 256 and 258 which activate valve operators 238 and 232 through control lines 254 and 260. The main line valve 228 will therefore be closed and equalizing line valve 236 will be closed. Productive flow of gas will continue in main line 222 in this condition while closure of valve 228 will isolate the ruptured portion of main line 224.

In parallel looped gas transmission systems the parallel main lines are not always of similar dimension. For example, one of the main lines may be thirty inches in diameter while the adjacent main line may be forty-two inches in diameter. A rupture in the larger main line would likely result in severly increased velocity in the equalizing lines of the system. On the other hand, a rupture in the smaller main line may have very little effect on the velocity of flow in the larger main line thereby resulting in delayed valve actuation for isolation of the rupture. For this reason it is considered more practical to utilize the pressure differential developed across the main lines in the event of a rupture thereby permitting valve actuation responsive to the magnitude and duration of the pressure differential. In the event of different sized main lines and for other reasons, it is desirable to alter the valve activating features of the control module responsive to the particular circumstance encountered. The gain control valves 212 and 214 thereby permit sufficient modification of the differential pressure sensing parameters of the control module so that it can be made to function efficiently under many different circumstances of pressure, flow, line size, etc. Moreover, since the needle valve 194 may be controlled by adjustment of a pressure calibrating device 195, the control module is subject to infinite adjustment to accommodate the various conditions that might be encountered.

Although the control module is shown and described as a pneumatic system, it is not intended to limit the present invention to pneumatic systems. The control valves may be coupled with hydraulic lines if desired, thereby providing the control module with a hydraulic/pneumatic control capability. Further, instead of hydraulic or pneumatic actuation, the valve operators may be controlled electrically and the control valve pistons may simply position electrical switching appropriately to accomplish selective electrically induced closing of desired main line valves and equalizing line valves.

In view of the foregoing, it is apparent that the present invention is clearly adapted to accomplish all of the features hereinabove set forth, together with other features which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A system for detecting and isolating a rupture in a gas transmission network incorporating plural gas transmission lines having main line valves located at intervals therealong and having valve controlled equalizing lines interconnecting said transmission lines at intervals therealong, said system comprising:
(a) first and second pipeline valve selector means being in controlling relation with said main line valves and equalizing line valves;
(b) flow controlled actuator means being coupled to said first and second selector means and being positionable in selective actuating relation with said first and second selector means responsive to the direction and velocity of gas flow in said equalizer line;
(c) flow detector means being located in said equalizing line and developing output signal means responsive to detection of flow, said output signal means being responsive to the direction and velocity of flow being detected and selectively energizing said flow controlled actuator means for selective closing of said first and second pipeline valve selector means to isolate the ruptured main line section; and
(d) compensating means rendering said flow controlled actuator means responsive only to flow in said equalizer line of sufficient duration to clearly indicate a condition of pipeline rupture.

2. A system as recited in claim 1, wherein said flow detector means comprises:
(a) a first pitot tube in said equalizer line and facing in one direction;
(b) a second pitot tube in said equalizer line and facing in the opposite direction, upon flow of gas within said equalizer line the pressure of said first and second pitot tubes representing a pressure differential being greater in the upstream direction, said pressure differential representing said output signal means.

3. A system as recited in claim 2, wherein:
said first and second pitot tubes are selectively coupled to said actuator means and being responsive to the direction of flow to accomplish selective actuation of said first and second pipline valve selector means and accomplish selective closure of main line valves and equalizing line valves to isolate the ruptured pipeline section.

4. A system as recited in claim 3, wherein said first and second pipeline valve selector means comprise:
(a) first valve means operatively coupled with certain main line valve means and certain equalizer valve means for isolation of a portion of the gas transmission network; and
(b) second valve selector means operatively coupled with other main line valve means and equalizer valve means for isolation of another portion of said gas transmission network.

5. A system as recited in claim 1, wherein said gas transmission network comprises three or more main lines with valve controlled equalizing line sections interconnecting each adjacent main line and said system further comprises:
(a) bidirectional pitot tubes being positioned in each equalizer line section;
(b) a bidirectional flow controlled actuator for each equalizer line section and being coupled to said bidirectional pitot tubes of the respective equalizer line section; and
(c) first and second valve selector valves being provided for each flow controlled actuator, said selector valves being controllably coupled to the valve operator of certain main line valves and equalizer line valves for isolation of the ruptured pipeline and continued flow through the serviceable main lines and equalizer lines.

6. A system as recited in claim 1, wherein said directional flow controlled actuator means comprises:
(a) a housing defining a pressure containing chamber therein;
(b) follower means dividing said pressure containing chamber into a pair of variable volume chambers each coupled respectively to said flow detector means, said follower means being movable within said chamber responsive to pressure differential; and
(c) said pipeline valve selector means being a pair of control valves selectively coupled to the valve operators of main line valves and equalizer line valves, said control valves being selectively operated by said follower means.

7. A system as recited in claim 1, wherein said directional flow controlled actuator means comprises:
(a) a differential pressure responsive element being selectively movable by said output signal means of said flow detector means; and
(b) said pipeline valve selector means being first and second control means positioned for selective mechanical actuation by said differential pressure responsive element, said first and second control valves being operatively coupled with the valve operators of certain main line valves and equalizing line valves.

8. A system as recited in claim 7, including:
(a) a housing defining a pressure containing chamber;

(b) said differential pressure responsive element being a follower dividing said pressure containing chamber into a pair of variable volume chambers;

(c) said first and second control means being valves having operating elements extending into respective ones of said variable volume chambers and being selectively moved by said follower for selective control of said valve operators of the valves of said main lines and equalizing lines.

9. A system as recited in claim 1, wherein said compensating means comprises:

bypass passage means interconnecting said pair of variable volume chambers, said bypass passage means being closed by said follower upon predetermined movement thereof and resulting in change of the gain of said directional flow controlled actuator means.

10. A system as recited in claim 9, wherein:

metering valve means is provided for said bypass passage means and is positioned by line pressure, said metering valve means accomplishing increase of bypass flow at high line pressure and throttling of bypass flow at lower line pressure.

11. A system as recited in claim 9, wherein:

said bypass passage means defines multiple outlets which are closed sequentially by said follower thus resulting in variation of the gain of said directional flow controlled actuator means responsive to the position of said follower within said pressure containing chamber.

12. A system as recited in claim 1, wherein said directional flow controlled actuator means comprises:

(a) a housing defining a generally cylindrical pressure containing chamber therein;

(b) a piston movably disposed within said housing and dividing said pressure containing chamber into first and second variable volume chambers, each of said variable volume chambers being in fluid communication with said flow detector means such that differential pressures representing flow in said equalizing line is developed within respective ones of said variable volume chambers and renders said piston movable responsive to said differential pressure, said piston defining valve actuator means;

(c) said pipeline valve selector means being a pair of selector valves being in controllable communication with the valve operators of selected main line valves and equalizing line valves; and (d) said valve actuator means of said piston engaging and causing valve closing operation of respective selector valves upon predetermined piston movement within said housing.

13. A system as recited in claim 12, wherein:

said directional flow controlled actuator means includes gain control means for controlling the gain thereof responsive to the position of said piston within said housing.

14. A system as recited in claim 12, wherein:

bypass passage means interconnected each of said variable volume chambers and are closed by predetermined positioning of said piston to change the gain of said actuator means.

15. A system as recited in claim 14, wherein:

metering valve means is in movable metering relation with said bypass passage means and adjusts the effective dimension of said bypass passage means responsive to the condition of line pressure in said equalizing line.

16. A system as recited in claim 15, wherein:

said metering valve is spring urged toward the throttled position and is urged by line pressure toward the open position thereof thereby causing throttling of said bypass passage at lower line pressure and opening of said bypass passage at higher line pressure.

17. A system as recited in claim 12, wherein:

each of said selector valves have latch means to retain them in the operated position thereof after having been shifted to the operated position by said valve actuator means of said piston.

18. A system as recited in claim 12 wherein each of said selector valves comprises:

(a) a valve housing defining a valve chamber having pressure inlet means, pressure output means, and vent means;

(b) a valve shuttle movably positioned within said valve housing and controlling flow. of fluid through said pressure inlet means, pressure output means and vent means; and (c) a shuttle control element extending from said shuttle into a respective one of said variable volume chambers for operative contact by said valve actuator means of said piston.

19. A system as recited in claim 18, wherein said shuttle control element comprises:

an elongated tubular element having an open end thereof positioned within said one variable volume chamber and having a closed opposite end extending through a housing seal and being positioned exteriorly of said valve housing, said tubular element defining spaced openings along the length thereof, in the actuated position of said tubular element one of said spaced openings being positioned outwardly of said housing seal thus venting valve chamber pressure from the downstream side of said shuttle and permitting rapid pressure induced shuttle movement to the valve closing position thereof.

20. A system as recited in claim 19, wherein:

resilient sealing means is provided on said valve actuator means of said piston and closes and seals said open end of said tubular element upon movement thereof into contact with said tubular element.

21. A system as recited in claim 12, wherein:

urging means urges said piston toward a central position within said housing.

22. A system as recited in claim 12, wherein:

urging means urges said selector valves toward the valve open positions thereof.

23. A method for pneumatically detecting and isolating a rupture in a gas transmission network incorporating two or more main transmission pipelines having main line valves at intervals and being interconnected at intervals by valve controlled equalizing lines, said method comprising:

(a) pneumatically detecting the direction of gas flow in at least one of the equalizing lines by detection of pressure differential established by a first pitot tube in the equalizing line and facing one direction and a second pitot tube in the equalizing line and facing in the opposite direction and developing output signal means;

(b) pneumatically detecting the magnitude of gas flow in said one equalizing line;

(c) introducing a time delay of sufficient duration to eliminate the possibility of valve actuation due to normal pressure variations in said gas transmission network; and (d) automatically closing main line valves and equalizing line valves selected by said output signal means to isolate the line segment having the rupture.

24. The method of claim 23, including:

correcting the output signal means for the pressure present in the gas transmission network.

* * * * *